D. S. STAFFORD.

Wheel Cultivator.

No. 37,309.

Patented Jan. 6, 1863.

Witnesses:
J. E. Fallon
N. H. Mathies

Inventor:
Daniel S. Stafford
By his atty. J. B. Crosby

UNITED STATES PATENT OFFICE.

DANIEL S. STAFFORD, OF DECATUR, ILLINOIS.

IMPROVEMENT IN CULTIVATORS.

Specification forming part of Letters Patent No. 37,309, dated January 6, 1863.

*To all whom it may concern:*

Be it known that I, DANIEL S. STAFFORD, of Decatur, in the county of Macon and State of Illinois, have invented certain new and useful Improvements in Cultivators; and I do hereby declare that the following, taken in connection with the drawings which accompany and form part of this specification, is a description of my invention sufficient to enable those skilled in the art to practice it.

My invention relates to improvements in an agricultural machine or implement which is designed to cultivate corn or other plants when growing regularly in lines of hills or in drills or rows; and it consists, first, in the manner of connecting in pairs the plows of the implement with the frame thereof and with each other, so that when one of the plows of a pair comes into contact with an obstruction—such as a root or a stone—it will yield backward, even so far as to come out of the ground, if necessary, and thus clear and escape the impediment without checking the team or breaking the implement; and it consists, secondly, in the method which I adopt for raising all of the plows out of the soil, so that the implement may be readily turned, or so that its cultivating operation may be discontinued over intervals during the onward course of the implement wherever cessation of action is desirable.

This invention may also be stated to be an improvement upon that which was patented to me January 15, 1861, and in this I retain the method which I then employed for turning or swerving to either side the machine from the general direction of its course so far as to accommodate crooks or curves in the line of plants or to avoid an obstruction without turning the team from its course, or, in other words, enabling me to guide the implement while keeping the row of plants between the animals of the team, the sidewise movement of the implement being effected, as described in said patent, by the effort of the driver while seated.

Figure 2:
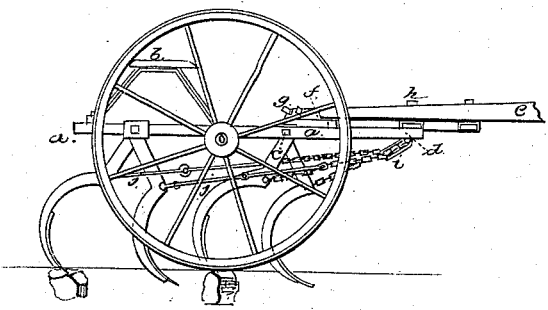
Figure 1:
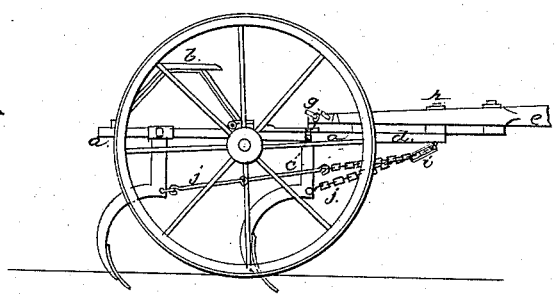
Figure 3:
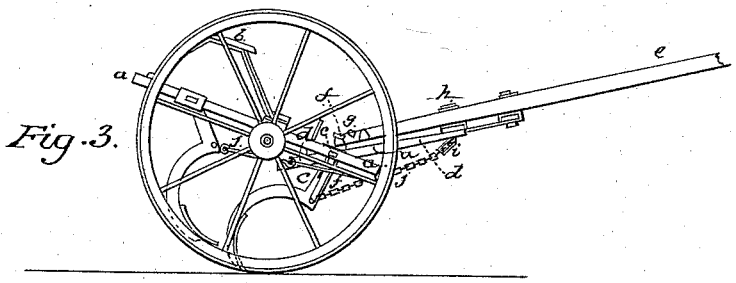
Figure 4:
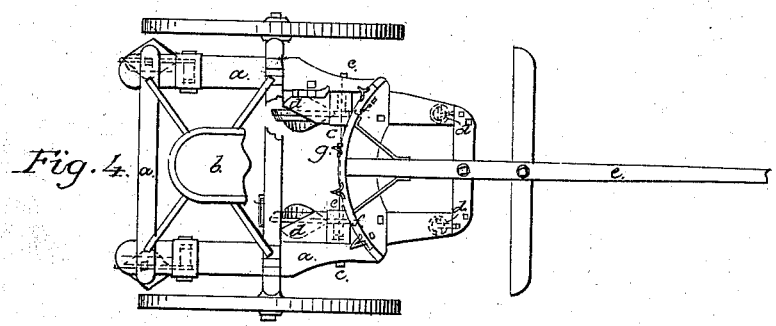

In the drawings, Figure 1 represents in side elevation my improved cultivator with its plows inserted in the soil as when performing its functions unobstructed. Fig. 2 shows in side elevation the same machine with each pair of plows, showing the position which they may assume when one plow of each pair meets with an obstruction. In this view the front plow of the pair nearest the observer is shown as obstructed and thrown out of the soil, and so, also, is the rear plow of the other pair farthest from the observer. Fig. 3 shows in side elevation the machine when in position to bring all the plows out of the soil by causing the frame to assume an angle to its position shown in Figs. 1 and 2. Fig. 4 shows the machine in plan in the position and condition illustrated in Fig. 1.

Referring to the drawings, in which similar letters refer to similar parts, I will now describe in detail the construction and operation of my invention.

The frame *a* is mounted on a pair of wheels, and is surmounted with a driver's seat, *b*. To this frame are pivoted four plows, of about the form shown in the drawings, which plows are designed to act together in pairs and in different planes. The front plows are intended to operate on either side of the row of plants, turning the soil up and toward them, while the rear plows act in a similar manner, though at greater distances from the row.

The distance of the plows apart with regard to the row of plants may be varied by changing their places of suspension, several slots being made in the frame to permit this adjustment of the plows.

To the main frame *a* there is pivoted, at *c c*, a frame, *d*, to which the pole or tongue *e* and its segment *f* and the projections *g* thereupon are connected by the pivot-bolt at *h*, there being upon *d* a bed which corresponds to the segment *f*. On the under side of *d*, on each side of the center, are fixed the pulleys *i*, over which pass the chains *j*. The plows on each side of the machine are coupled together into pairs by these chains, so that if one plow of either pair is drawn back the other plow of the pair is advanced, and as the point of suspension of each plow is somewhat forward of the point of the plow it will be seen that advance of a plow by motion on its pivot will at first cause the plow thus advancing to have a deeper hold in the soil.

It will be seen that as the plows are suspended, and are thus connected in pairs by chains passing over pulleys, either plow of a pair may be held by an obstruction from progressing with the rest of the machine, which draws back the obstructed plow relative to the machine and advances its fellow, the effect of which is to let the obstructed plow rise and pass over the obstacle, and when the obstacle is thus evaded the resistance to the progress of the other plow, being greater than is upon the plow just thrown out of the soil, will check the progress of the plow which is in the soil, so that it will be moved backward relative to the frame, and this will bring the other plow of the pair again into the soil. The plows will thus move relative to the frame and relative to each other whenever and while they meet with unequal resistance; but when the resistance to each is equal each plow of each pair will dip the same distance into the soil.

If both plows of a pair should meet with obstacles, the team would probably be checked, or else some part of the machine would give way, and to prevent injury to parts which are expensive and are not easily replaced I recommend that a pin of one shackle of each pair of plows be made the weakest part of the machine, so that by the giving out of these, which may be easily and instantaneously replaced, serious injury to the machine by a double obstruction or a dead-lock is prevented.

In going to or in coming from the field the plows may be swung up and held out of contact with the road.

The axle is of iron and does not extend entirely across the machine, but is made of two short pieces, which enables me to set the wheels at a distance apart which will accommodate the distance between the rows by sliding the short axles toward or from each other, the clamps which hold the axle being such as may be tightened or loosened for this purpose.

As the end of the pole or tongue is supported by the team at a fixed height, it will be evident that if a bend, break, or depression can be made between the end of the pole and the axle so much of the frame as overhangs the axle will incline upward, pivoting on the center of the wheels.

The frame is made in two parts, $a$ and $d$, and hinged together at $c$ for the purpose of enabling the driver, while in his seat, to depress the frame between the axle and the end of the pole, which he does, throwing his weight off from the seat upon a more forward portion of the frame, or else by pressing upon the forward portion of the frame. This causes the two parts of the frame to assume the position shown in Fig. 3, greater angularity being prevented by a stop fixed on the under side of $a$. To keep the frames in this position relative to each other, a weighted lever, $k$, is secured to the top side of $a$, which, when placed in a vertical position, by its own gravity acts as a stop or latch to keep the frames from assuming their normal position consequent upon change of place or effort of the driver, who may now turn the machine or drive it over intervals without having the plows operate.

It will be evident, when the frames are in the position shown in Fig. 3, that the rear plows will hang clear from the soil, and that the front plows will then have nothing to keep them from drawing back and up out of the soil, where they will drag, just scratching the surface.

When it is proper to have the machine resume its operations the driver operates the weighted lever with his foot, putting it into a horizontal position, and throws his weight upon his seat, which causes the frames to assume their normal positions.

When it is desired to have the plows operate to throw the soil from the rows of plants instead of toward them it is only necessary to shift their inclined parts or mold-boards from the right to the left hand plows.

I claim—

1. The suspended and dually-connected arrangement of single plows, in combination with each other and with a wheeled carriage, so as to operate substantially as described.

2. In combination with the suspended and connected arrangement of plows in pairs, so constructing and arranging the carrying-frame thereof that it may be inclined by the driver so as to operate substantially as specified.

DANIEL S. STAFFORD.

Witnesses:
JOHN H. BROWN,
A. T. RISLEY.